(No Model.)
A. LEVEDAHL & G. S. WEBB.
WOOD RIMMED BICYCLE WHEEL.
No. 536,089. Patented Mar. 19, 1895.
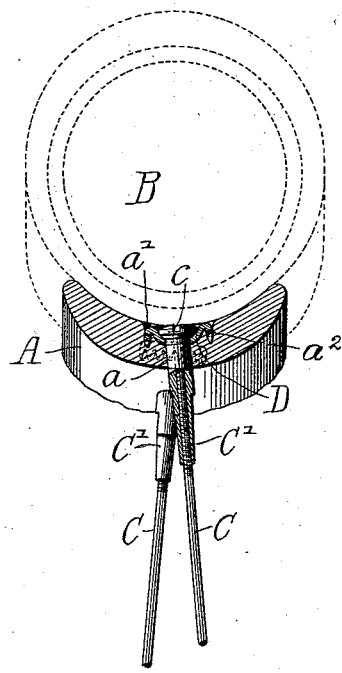
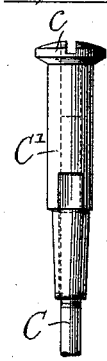
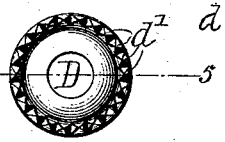
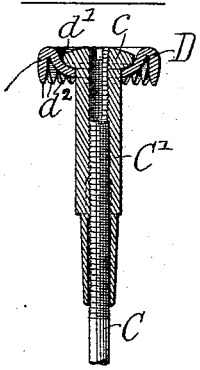
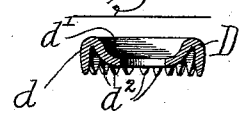
Witnesses:—
Louis M. F. Whitehead.
Jno. W. Adams
Inventors:
Axel Levedahl.
George S. Webb.
by Dayton, Poole & Brown
Attorneys

United States Patent Office.

AXEL LEVEDAHL AND GEORGE S. WEBB, OF AURORA, ILLINOIS, ASSIGNORS TO AUTOMATIC MACHINERY CO., OF SAME PLACE.

WOOD-RIMMED BICYCLE-WHEEL.

SPECIFICATION forming part of Letters Patent No. 536,089, dated March 19, 1895.

Application filed March 8, 1894. Serial No. 502,801. (No model.)

*To all whom it may concern:*

Be it known that we, AXEL LEVEDAHL and GEORGE S. WEBB, of Aurora, in the county of Kane and State of Illinois, have invented certain new and useful Improvements in Wood-Rimmed Bicycle-Wheels; and we do hereby declare that the following is a full, clear, and exact description thereof, reference being had to the accompanying drawings, and to the letters of reference marked thereon, which form a part of this specification.

This invention relates to an improved construction in wood rimmed bicycle and similar wheels of that class in which spoke washers adapted to engage the wood of the rim around the spoke holes and serving in effect as clamps, by which the opposite sides of the rim are firmly bound together are employed to overcome the tendency of the rim to split along its center line where it is weakened by the boring of the spoke holes.

The invention consists in the matters hereinafter set forth and particularly pointed out in the appended claim.

In the accompanying drawings:—Figure 1, is a transverse sectional detail taken through the rim of a bicycle wheel constructed in accordance with my invention, the pneumatic tire thereof being indicated by dotted lines. Fig. 2, is a detail of the spoke nipple shown in Fig. 1. Fig. 3, is a longitudinal section of the nipple and washer showing the end of the spoke proper. Fig. 4, is a bottom plan view of the spoke washer alone. Fig. 5, is a sectional detail on line 5—5 of Fig. 4.

A, designates the wood rim of the wheel, said rim being made in the usual manner by bending a suitable strip of wood into the form of a ring or hoop of the proper diameter and securing its end together by any convenient form of joint possessing the necessary strength and stiffness. As herein shown, and ordinarily such rim will be made of crescent shape in cross section so as to present a peripheral groove in its outer face within which a pneumatic or other tire B, may be seated.

C C designate the wire spokes of the wheel, said spokes being in this instance shown as connected with the rim A by tubular nipples C' C' of a familiar type. Said nipples are passed through the usual spoke holes $a$ of the rim and have a screw thread connection with the spokes by means of which the tension of the latter may be adjusted as desired.

D, D, are metallic spoke washers placed beneath the heads $c$ of the nipples C' to distribute the strain of the spokes on the rim and protect the latter from wear when the nipples are turned in adjusting the tension of the spokes. Said washers are stamped from sheet metal into the shape desired, and in the present improvement are made of circular form with a down turned marginal flange $d$ which is serrated to provide downwardly projecting spurs or teeth $d'$ that are adapted to penetrate the wood around the spoke holes. Said washers are furthermore formed with a central depression or cup $d^2$ within which the head $c$ of the nipple is adapted to rest as in a counter-sink. Circular recesses $a'$ are counterbored in the concave face of the rim around the spoke holes to receive the washers D. The center of each recess is cupped out to receive the depressed center of the washer and the recess is provided at its outer margin with an annular groove $a^2$ made deep enough to receive the upper portion of the downwardly turned marginal flange $d$ of the washer, but of less depth than the serrated lower edge or teeth $d'$ thereof. The washers D are forced into the recesses $a'$ until substantially flush with the concave face of the rim, and as the head $c$ of the nipples is seated within the central cup of the washers all unevenness liable to interfere with the tire B is avoided. The marginal groove $a^2$ receives the flange $d$ and the teeth $d'$ of said flange penetrate the wood at the bottom of the groove and thereby grip the rim so as to positively resist any tendency of the same to split along the line of its spoke holes. Furthermore the flange $d$ also surrounds and incloses the annular ridge of wood remaining between the depressed central portions of the recess and its marginal groove $a^2$, and afford an additional clamping action which will obviously increase as the washer is drawn more and more deeply into the rim by the strain of the spoke upon it, since the interior diameter of said flange is necessarily contracted toward its upper edge where it curves inwardly to join the main body of the washer and it consequently tends to more and more closely compress the ring of wood which is inclosed by the flange. In fact, the clamping action desired might be attained to a limited extent by a washer provided with a down turned marginal flange and used in connection with a peripheral groove adapted to be closely engaged by said down turned flange, even if the latter were not serrated, although the construction herein shown in which the marginal teeth penetrate the wood at the bottom of the peripheral groove represents the perfected and practically successful structure for the purpose.

The circular form of the washer shown is also of the greatest practical importance, since it enables the counter-sunk recesses $a'$ and grooves $a^2$ to be readily and quickly cut out by means of a rotary cutting tool that will ordinarily be secured to the drill by which the spoke holes $a$ are bored, so that each spoke hole $a$ together with its surrounding recess $a'$ and groove $a^2$ will be formed at a single operation in practically the same time ordinarily required to bore the spoke hole alone. The washers D are in practice driven into the counter-sunk recesses thus formed, and the points of the teeth forced into the wood at the bottom of the marginal grooves $a^2$ thereof, by the use of a punch having its lower end made of the proper shape to closely fit the outer face of the washer. By reason of the pressure of the grooves $a^2$ however, the teeth need be driven into the wood only a short distance, and the washers may therefore be much more easily applied than would otherwise be the case, while at the same time the presence of the groove insures a more secure hold of the washer upon the wood and a superior clamping action.

The nipples C' herein illustrated are ordinarily used on "tangent" or other spokes which are attached to the hub of the wheel in such manner as to be held against rotation, but although herein shown as employed in connection with such nipples, the improved spoke washers set forth are equally adapted for use with "direct" spokes, or spokes which are themselves headed at their outer ends to engage the rim directly, and in such case the head of the spoke itself, instead of the head of an intermediate nipple, occupies the depressed center of the washer.

The spoke holes $a$ are, of course, necessarily bored at short distances apart throughout the entire length of the rim, and as the grain of the wood also preferably extends longitudinally of the rim the tendency of the latter to split from spoke hole to spoke hole when the wheel is subjected to a sudden pressure or shock is very great, and is largely aggravated by the fact that in bicycle wheels, or wheels built on the suspension principle, the alternate spokes draw off at an angle in opposite directions and thereby directly tend to pull the rim apart longitudinally along its center line. In a wheel constructed as herein set forth, however, the clamping action of the peculiar spoke washers employed not only entirely compensates for the loss of material removed in boring the spoke holes, but actually imparts additional lateral strength to the rim by reason of which its cross-section may be reduced in area without danger of the longitudinal splitting heretofore encountered, and in view of the well known fact that the principal object of employing wood in the construction of bicycle and similar wheels is to provide a rim which is as light as is possibly consistent with the necessary strength and rigidity, the importance of the present invention in contributing to the same end by enabling the cross-section of the rim to be so reduced in area without loss of strength will be manifest.

Several forms of spoke washers intended to accomplish the same general result as the construction herein shown, have been heretofore suggested, but in every case such washers have been secured in place either by separate nails or fastening wires, or by a few scattered teeth which had to be driven into the wood their entire length in order to bring the under surface of the washer firmly against the face of the rim; and as the washers were furthermore made of other than circular shape, the difficulty of forming a correspondingly shaped counter-sink to receive them made it practically impossible to use such a counter-sink, and they were left to project into the concavity of the rim and in position to interfere with the elastic tire which is seated therein. Such devices, therefore, have never gone into use or met with the approval of the cycle industry.

We claim—

A vehicle wheel provided with a wooden rim, wire spokes having headed parts or nipples engaging said rim, circular spoke washers having central concavities within which the heads of the spokes or nipples are seated and provided with down turned toothed marginal flanges, and concentric grooves counterbored into the rim around each spoke hole, in which grooves said flanges are inserted and into the wood at the bottom of which the teeth of the flanges are forced, whereby the portions of the rim on opposite sides of the spoke holes are firmly clamped together against splitting, substantially as described.

In testimony that we claim the foregoing as our invention we affix our signatures in presence of two witnesses.

AXEL LEVEDAHL.
GEORGE S. WEBB.

Witnesses:
JOHN M. RAYMOND,
A. H. SWITZER.